3,258,382
IN SITU HYDROLYSIS OF ALKOXY SILANES CONTAINING ORTHOTITANATE CATALYSTS
Harold L. Vincent, Midland, Mich., assignor to Dow Corning Corporation, Midland, Mich., a corporation of Michigan
No Drawing. Filed Apr. 19, 1961, Ser. No. 103,976
16 Claims. (Cl. 156—329)

This invention relates to the art of in situ hydrolysis of alkoxy silanes on fillers and to the use of these impregnated fillers to make improved molded articles.

The conventional method of making molded articles has been to impregnate the filler with partially condensed siloxanes, which are prepared by the hydrolysis of hydrolyzable silanes, and then to pre-cure and mold the impregnated filler. The conventional method of hydrolyzing alkoxy silanes has been to mix the silane with water, usually with a solvent under conditions which form a two-phase system. Because the alkoxy silanes were difficult to hydrolyze, a mineral acid was usually added as a hydrolysis catalyst. The water and solvent-silane mixture were separated after the hydrolysis was completed. It was then necessary to neutralize the hydrolyzate solution. The hydrolysis product could be separated from the solvent by evaporation.

The fact that a strong acid catalyst has been heretofore used in the hydrolysis of alkoxy silanes, has invariably resulted in extensive condensation of the resulting hydrolyzate. Thus, under normal conditions for producing siloxane resins it has been essential that a large amount of solvent be employed to prevent gelation of the hydrolyzate. Furthermore, the resulting product has a relatively low silicon bonded hydroxyl content (i.e. 6 percent by weight or below).

The same factors prevail when one hydrolyzes a halosilane. Here of course large quantities of strong acid are produced. Thus, there is invariably extensive condensation of the hydrolyzate and the use of solvent is imperative.

Because of the above factors the present commercial silicone laminating and molding resins have been characterized by relatively low hydroxyl content, relatively high molecular weight as shown by a 50 percent solution viscosity of about 25 cs. and by the presence of appreciable amounts of cyclic siloxenes which contain no SiOH groups. The latter are caused by the combined action of a strong acid catalyst and a solvent. These conditions promote the formation of cyclic structures.

The presence of these cyclics has resulted in some undesirable effects; the chief of which is extensive loss of physical strength of the cured resin at temperatures of 500° F. or above. Since silicone resins are designed for operation at elevated temperatures, this loss of strength has been a considerable handicap to the use of silicone resins for structural purposes.

It is an object of this invention to provide a method of hydrolyzing alkoxy silanes without the necessity of adding acid to the system. Satisfying this object would also eliminate the neutralization step and permit the hydrolysis to take place at a neutral pH. A further object of this invention is to provide a faster and more efficient method of hydrolyzing alkoxy silanes. Another object of this invention is to achieve better impregnation of various fillers in a shorter time. Another object is to provide a method of making molded articles of improved high temperature strength. A still further object is to provide a method of impregnating various fillers in a continuous and efficient process. Another object is to provide a method of hydrolyzing alkoxy silanes after they have been saturated into fillers.

This invention relates to a method of preparing a silicone resin impregnated filler which comprises (1) contacting a filler with a mixture of (A) a silane of the formula $R_nSi(OR')_{4-n}$ in which R is selected from the group consisting of phenyl and monovalent aliphatic hydrocarbon radicals with less than four carbon atoms and R' is an alkyl group of less than 4 carbon atoms with $n$ having an average value of from .9 to 1.9 and (B) a hydrolysis catalyst selected from the group consisting of orthotitanates having the general formula $Ti(OR'')_4$ and partial condensates thereof, in which R" is composed of hydrogen and from 1 to 30 inclusive carbon atoms with any additional atoms in R" being selected from the group consisting of (a) nitrogen, which is present in the form of carbon-bonded amino group, there being no more than four such nitrogen atoms per R" group, and (b) oxygen, which is present in the form of groups selected from the group consisting of

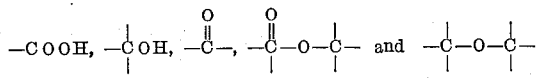

groups, wherein at least one of the unsatisfied valences of such group is satisfied by any remaining portion of the R" group and no more than one valence of such group is satisfied by a titanium-bonded oxygen, with any remaining unsatisfied valences being satisfied by hydrogen, there being no more than four total

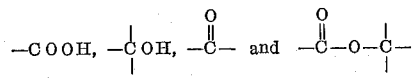

groups per R" group, said catalyst being present in an amount from .0002 to .06 mole of Ti per mol of Si, and (2) then contacting the filler with water whereby the silane (A) is at least partially hydrolyzed, said silane (A) being employed in such amount that there is at least 1.5 percent by weight residual organosiloxane based on the weight of the filler.

The average value of $n$ is from .9 to 1.9 which means that the silane can be a pure silane of the type $RSi(OR')_3$ or mixtures of two or more silanes of this type or the silane can be a mixture of silanes of the formula $RSi(OR')_3$ with limited amounts of silanes of the type $Si(OR')_4$, $R_2Si(OR')_2$ and $R_3SiOR'$.

In the silanes employed herein, R can be, for example, phenyl, methyl, ethyl, propyl, vinyl, and allyl. Preferably R is phenyl or phenyl and methyl. R' can be methyl, ethyl and propyl. Preferably R' is methyl.

The hydrolysis catalysts employed herein include orthotitanates of the formula $Ti(OR'')_4$ and partial condensates thereof. R" is composed of hydrogen and from 1 to 30 inclusive carbon atoms. Example 8, paragraph 1, contain examples of aliphatic (both saturated and unsaturated) and aromatic hydrocarbon titanates.

Any atoms other than carbon and hydrogen which can be present in R" are selected from the group consisting of nitrogen and oxygen atoms. Nitrogen is present in the form of carbon-bonded amino groups, there being no more than four such nitrogen atoms per R" group. Such R" group can contain tertiary (Example 8, paragraph 2) secondary (Example 8, paragraph 3) or primary amino groups (Example 8, paragraph 4).

Oxygen is present in the form of groups selected from the group consisting of

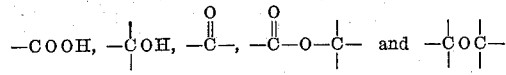

groups, wherein at least one of the unsatisfied valences of such groups is satisfied by any remaining portion of the R" group and no more than one valence of such group is satisfied by a titanium-bonded oxygen, with any remaining unsatisfied valences being satisfied by hydrogen, there being no more than 4 total

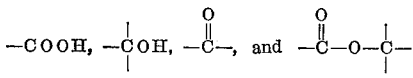

groups per R″ group. There can be four of any one of these groups or a total of 4 of the various combinations of these 4 groups. There can be any number of ether linkages in R″. For example, R″ in the last formula in Example 8, paragraph 7, contains 15 ether linkages. However, there is no particular advantage in having a large number of these linkages present.

The oxygen can be present as a —COOH group, such as shown in Example 8, paragraph 10. The carbon atom of the carboxyl group is bonded to the remaining part of R″ which in turn is bonded to the titanium-bonded oxygen atom.

The oxygen can be present in a

group as shown in Example 8, paragraph 6. The hydroxyl group can be present in the same R″ group as a nitrogen atom [Example 8, paragraph 2(a) and 3(b)] or a

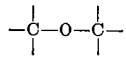

group (Example 8, paragraph 8) or in combination with any of the other oxygen containing groups. The hydroxyl group can also be present at any point along the carbon chain and may be attached to a primary, secondary or tertiary carbon atom, as shown in Example 8, paragraph 6, and more than 1 hydroxyl group can be present (subject to the above limitations on the total number of certain oxygen containing groups).

The oxygen can also be present as a

group. Thus R″ can be a carboxy acyl group, (Example 8, paragraph 5); or a keto group, (Example 8, paragraph 9); or an aldehyde group (Example 8, paragraph 12). When R″ is an acyl group the titanate is usually in polymeric form.

Oxygen can also be present in a

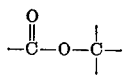

group as shown in Example 8, paragraph 11. This ester group can occupy either a terminal or any non-terminal position in R″. Either the alcohol or acid derived portion of the ester group can be bonded to the titanium-bonded oxygen as shown in Example 8, paragraph 11(a) and 11(b) respectively.

Finally, the oxygen can be present in a

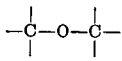

group as shown in Example 8, paragraphs 7 and 8.

Titanates can be prepared containing various combinations of the nitrogen and oxygen containing groups, subject to the specified limitations on the total number of certain groups. For example, R″ groups containing both a hydroxyl group and nitrogen atom are shown in Example 8, paragraphs 2(a) and 3(b). R″ groups containing both OH groups and ether linkages are shown in Example 8, paragraph 8.

It should be apparent that not all of the R″ groups attached to the titanate need be the same. Example 8 contains numerous examples of titanates with mixed R″ groups.

Partial condensates of the above titanates can also be used. These partial condensates are characterized by having some of the (OR″) groups removed by hydrolysis and can contain TiOTi linkages. These partial condensates are ethanol soluble. For example, the following partial condensates can be used:

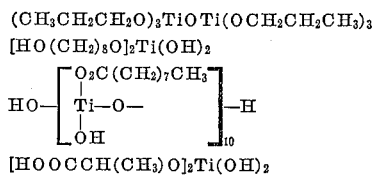

The orthotitanates employed in this invention are well known commercial materials. On the basis of commercial availability tetrabutyl and tetraisopropyl titanates are preferred.

A curing catalyst can be mixed with the silane and orthotitanate mixture to promote the more rapid and effective curing of the hydrolysis product. Such catalysts are well known in the art. The catalysts disclosed in U.S. Patent No. 2,906,734 may be used in this invention. Other catalysts that can be used include metallic salts of carboxylic acids such as lead octoate, zinc hexoate, cobalt naphthenate and indium octoate; quaternary ammonium compounds such as trimethyl ammonium butoxide, benzyltrimethyl ammonium 2-ethylhexoate and beta-hydroxy ethyltrimethyl ammonium butoxide and amines such as triethanol amine. This list merely illustrates some of the curing catalysts that can be used. Such catalysts are not essential to the operativeness of this invention. The optimum amounts of catalyst to be used varies with the type of catalyst and the precise silane formulation. The curing catalyst can be added to the silane-titanate mixture or at any time thereafter up to the time curing starts.

The silane and titanate can be mixed in any suitable manner. The preferred method of contacting the filler with the silane-titanate mixture is by immersing the filler into the mixture. The filler can also be saturated by spraying, brushing or roller coating the silane-titanate mixture onto the filler. In any event the filler must be contacted with silane-titanate mixture a sufficient length of time or a sufficient number of times to obtain a pickup of at least 1.5 percent by weight residual organosiloxane based on the weight of the filler. Because of the low viscosity of the silane-titanate mixture, one obtains better impregnation of the filler than is obtained with heretofore employed commercial siloxane molding resins.

After the filler has been saturated with the silane-titanate mixture, it is then contacted with water until at least partial hydrolysis has occurred. For molding most fillers, it is desirable to completely hydrolyze the silane in order to prevent excessive loss of organosilicon material during the heating step hereinafter described. The preferred methods of contacting the silane-saturated filler with the water is by immersing the filler into the water or by exposing the saturated filler to moisture containing air. The contact with water can be by spraying, brushing or roller coating the water onto the silane-saturated filler or by contacting the silane-saturated filler with steam. In any event, the silane-saturated filler must be contacted with water a sufficient length of time or a sufficient number of times until the silane is at least partially hydrolyzed. The hydrolysis may go to completion in a few seconds or may require several hours depending upon the silane, amount of titanate and source of water used. In any event the hydrolysis occurs more rapidly with the titanate than without it.

Hydrolysis of the silane-saturated filler occurs in situ when the filler is contacted with water. It is generally desirable for the hydrolysis to go to completion in this step, but the impregnated filler may contain some unhydrolyzed alkoxy groups particularly when the contact with water is for a short time. It is believed that the hydrolysis products are low molecular weight organosilanols, organosiloxanols and organosiloxanes characterized in having high SiOH content.

Since the fillers are saturated with silanes, the hydrolysis and condensation takes place in situ on the filler in the absence of solvent, thereby avoiding or minimizing the formation of cyclic siloxanes which cause a large decrease in strength at high temperatures. This is believed to be the reason why the method of this invention gives superior molded articles.

The silane-titanate mixture has a shelf life of several months, which makes it possible to prepare the mixture several months prior to its use. The use of a titanate catalyst allows the dipping of the filler into the silane-titanate mixture immediately after it is prepared. Thus, the neutralization step is eliminated.

Any filler that can be impregnated with conventional siloxane resins can be saturated with the silane-titanate mixture and then hydrolyzed in accordance with this invention. The filler can be in sheet, fibrous, or particulated form. Inorganic materials, such as metals, asbestos fibers and cloth, diatomaceous earth, talc, glass fibers and cloth, flake and integrated mica, metallic oxides such as aluminum oxide, $TiO_2$, MgO, ferric oxide, zinc oxide, crushed quartz, clays, finely divided silica, carbon black, powdered glass, silica aerogels and similar inorganic materials can be used. Organic fillers such as paper (e.g., alpha-cellulose paper), nylon, Dacron, sawdust, etc., can be used.

After the filler has been saturated and hydrolyzed, it is heated in order to at least partially cure the siloxane resin and consolidate the article. This initial curing can be carried out at from 90 to 120° C. in the absence of a curing catalyst or at lower temperatures when such catalysts are employed. For many applications the above cure is sufficient. This is particularly true when the filler is an organic material, such as alpha-cellulose paper, or when the primary use of the article is to be at relatively low temperatures. However, it is often desirable to cure the resin at higher temperatures (i.e. from 150 to 250° C.) when maximum strength at elevated temperatures is desired.

If desired, pressure can be applied during the heating step in order to aid in the consolidation of the article. The materials of this invention can be molded at relatively low pressures such as 10 p.s.i. although higher pressures can be employed if desired. Whether pressure is employed or not depends upon the type of article being made. When, for example, one wishes to bond glass mat for use as thermal insulation, one can simply spray the mat with the silane-titanate mixture and thereafter heat in the presence of water to cure the resin. This bonds the fibers together at their points of intersection and produces a consolidated mat.

The compositions of this invention are particularly useful for making laminates in which the filler is a fibrous material such as asbestos, glass fibers or glass fabric. After hydrolysis has been completed conventional laminating techniques are used. In making a laminate, the fibrous material is saturated with the silane-titanate mixture, then hydrolyzed and thereafter heated to remove volatiles and partially cure the resin. This process can be advantageously carried out continuously by passing the fibrous material through the silane-titanate mixture, then through a water bath and then through a curing tower.

The resulting impregnated sheets can then be stacked to give the desired thickness and molded under heat and pressure to form a unitary article. If desired the laminate can be further cured at temperatures up to 250° C. or above to develop its maximum strength for high temperature use.

The molded articles of this invention have improved high temperature strength as shown in the examples.

The molded articles of this invention are useful as structural members for electrical insulation and for thermal barriers.

The following examples are illustrative only and should not be construed as limiting the invention which is properly delineated in the appended claims. All of the tests for flexural strength were made in accordance to ASTM D 790–49 T. Flexural strengths were determined immediately after the molded article had been exposed to the testing temperature for 30 minutes.

*Example 1*

A heat cleaned 181 glass cloth, which is a continuous filament satin weave fabric with nodes on one side of the sheet and corresponding indentations on the other side of the sheet, was dipped into a mixture of 990 g. of phenyltrimethoxysilane and 4.95 g. of tetrabutyl titanate. The saturated glass cloth was air dried for one hour and then pre-cured for 10 minutes at 110° C. in an air circulating oven. In this case the silane was hydrolyzed by atmospheric moisture. There was a resin pickup of 28 percent by weight of solids based on the weight of the glass cloth. The cloth was again dipped into the above silane-titanate mixture and air dried and pre-cured as above. The resin pickup increased to 37 percent. 14 plies (7" x 7") of the impregnated glass cloth were stacked so that nodes on each sheet fitted into the indentations in the adjoining sheet. The sheets were then pressed together under a pressure of 10 p.s.i. at 175° C. for 30 minutes. The resulting laminate was then after-baked in an oven for 12 hours at 250° C. The laminate had a flexural strength of 32,900 p.s.i. at room temperature and 25,400 p.s.i. at 260° C. After an additional 200 hours of afterbaking at 250° C., the laminate had a flexural strength of 41,900 p.s.i. at room temperature and 20,900 p.s.i. at 260° C.

*Example 2*

A heat cleaned 261 glass cloth, which is a continuous filament taffeta weave broad glass fabric, was continuously passed through a dip pan containing 1,000 g. of a mixture 73.3 mol percent phenyltrimethoxysilane and 26.7 mol percent methyltrimethoxysilane and 10 g. of tetraisopropyl titanate. The saturated glass cloth was then passed through a dip pan containing $H_2O$ and then through a 6 ft. air circulating curing tower at a speed of ⅔ ft. per minute. The top of the tower had a temperature of 107° C. There was a resin pickup of 34 percent. The above process of dipping into a silane-titanate mixture, then into water and then running through a curing tower was repeated with some of the impregnated glass cloth. The resin pickup was increased to 45 percent. Laminates were made from both the single and double dipped cloths by pressing 40 plies (6" x 6") of the impregnated glass cloth together under a pressure of 1,000 p.s.i. at 175° C. for 30 minutes. The resulting laminates were then after-baked in an oven for 4 hours at 250° C. The laminate had a flexural strength single dip of 10,100 p.s.i. and double dip of 14,400 p.s.i. at room temperature; single dip 8,140 p.s.i. and double dip 10,700 p.s.i. at 260° C.

*Example 3*

An asbestos paper composed of extra-long staple non-ferrous Canadian crude fibers with a 5 percent phenolic resin binder, was dipped into the silane-titanate mixture of Example 2 and then dipped into water and run through a 6 feet curing tower at a speed of ⅔ ft. per minute. The top of the tower had a temperature of 109° C. There was a resin pick-up of 50 percent. 34 plies (8" x 8") of the impregnated asbestos sheets were stacked and then pressed together under a pressure of 1,000 p.s.i. at 175° C. for 30 minutes. The resulting laminate was after-cured for 4 hours at 250° C. The laminate had a flexural strength of 14,800 p.s.i. at room temperature and 10,385 p.s.i. at 260° C.

Example 4

An asbestos paper composed of extra-long staple nonferrous Canadian crude fibers with no binder, was continuously passed through a dip pan containing 1,000 g. of a mixture of 74.7 mol percent phenyltrimethoxysilane, 20.3 mol percent methyltrimethoxysilane, 5 mol percent phenylmethyldimethoxysilane and 30 g. of tetraisopropyl titanate. The saturated paper then passed through a dip pan containing water and run through a 6 ft. curing tower at a speed of 1 ft. per minute. The top of the tower had a temperature of 110° C. There was a resin pick-up of 60 percent. 14 plies (3″ x 3″ sheets) were pressed together under a pressure of 1,000 p.s.i. for 30 minutes at 175° C. The resulting laminate was aftercured for 4 hours at 250° C. The laminate had a flexural strength of 31,150 p.s.i. at room temperature and 19,250 p.s.i. at 260° C.

Example 5

Heat cleaned 261 style glass cloth was dipped in the silane-titanate mixture of Example 4 and then dipped in water and cured in a curing tower under the conditions of Example 4. There was a resin pick-up of 37.8 percent. 42 plies (6″ x 6″) of the impregnated glass cloth were stacked and pressed together under a pressure of 1,000 p.s.i. at 175° C. for 30 minutes. The resulting laminate was ½ in. thick and had the following flexural strengths after curing for 4 hours at 250° C. The laminate had a flexural strength of 14,437 p.s.i. at room temperature and 11,792 p.s.i. at 260° C.

Example 6

The asbestos paper described in Example 4 was dipped into 1,000 g. of a mixture of 30.3 mol percent phenyltrimethoxysilane, 30.3 mol percent methyltrimethoxysilane, 30.3 mol percent phenylmethyldimethoxysilane, 9.9 mol percent diphenyldimethoxysilane and 70 g. of tetraisopropyl titanate. The saturated asbestos paper was air dried overnight and then precured for 10 minutes at 150° C. In this case the silane mixture was hydrolyzed by atmospheric moisture. There was a resin pick-up of 43 percent. 9 plies (9″ x 12″) of the impregnated asbestos paper were pressed together under a pressure of 1,000 p.s.i. at 175° C. for 3 hours. The resulting laminate was aftercured for 4 hours at 250° C. The laminate had a flexural strength at room temperature of 32,300 p.s.i. This laminate had a dielectric breakdown strength in air greater than 485 volts per mil.

Example 7

13.6 g. of tetraisopropyl titanate and 4.54 g. of triethanol amine were added to a mixture of 454 g. of 74.5 mol percent phenyltrimethoxysilane, 20.3 mol percent methyltrimethoxysilane and 5.2 mol percent phenylmethyltrimethoxysilane. A heat cleaned 261 glass cloth was dipped into the above mixture and then dipped into a water bath. The glass cloth was then precured for 10 minutes at 110° C. There was a 49 percent resin pickup. 10 (6″ x 6″) plies of impregnated glass cloth were then stacked and pressed together under a pressure of 1,000 p.s.i. at 175° C. for 30 minutes. The resulting laminate was then aftercured for 12 hours at 250° C. The laminate had a flexural strength of 15,617 p.s.i. at room temperature and 14,183 p.s.i. at 260° C.

Example 8

Equivalent results are obtained when the method of Example 1 is repeated using one of the following catalysts in place of tetra-n-butyl titanate at the same mol ratio of Ti to Si:

(1)

tetraphenyl, tetra-2-ethylhexyl, tetraoctyl, tetraundecyl, tetraoctadecyl, tetrapentacosyl, tetra-triacontyl, tetrallyl, tetra-1-hexenyl, tetra-4-octenyl, tetra-12-octadecenyl and tetra-20-triacontenyl titanates; a partial condensate of the formula $(CH_3CH_2CH_2CH_2O)_3TiOTi(OCH_2CH_2CH_2CH_3)_3$ (2(a))

$[(HOCH_2CH_2)_2NCH_2CH_2O]_2Ti[OCH(CH_3)_2]_2$
$[(HOCH_2CH_2)_2NCH_2CH_2O]_4Ti$
$[(HOC_3H_6)_2N(CH_2)_3O]_2Ti[OCH(CH_3)_2]_2$
$[(HOC_3H_6)_2N(CH_2)_3O]_4Ti$
$[(HOC_6H_{12})_2N(CH_2)_6O]_2Ti[OCH_2CH(CH_3)_2]_2$
$[(HOC_8H_{16})_2N(CH_2)_8O]_2Ti[OCH(CH_3)_2]_2$
$[(CH_3CH_2)_2N(CH_2)_2O]_2Ti[OCH_2CH(CH_3)_2]_2$
$[(CH_3CH_2)_2N(CH_2)_2O]_4Ti$
$[(CH_3C_2H_4)_2N(CH_2)_3O]_2Ti[OCH(CH_3)_2]_2$
$[(CH_3C_2H_4)_2N(CH_2)_3O]_4Ti$
$[(CH_3C_5H_{10})_2N(CH_2)_6O]_2Ti[OCH_2CH(CH_3)_2]_2$
$[(CH_3C_7H_{14})_2N(CH_2)_8O]_2Ti[OCH(CH_3)_2]_2$ (3(a))

$[(CH_3CH_2NHCH_2CH_2O]_2Ti[OCH(CH_3)_2]_2$
$[(CH_3CH_2NHCH_2CH_2O]_4Ti$
$[CH_3(CH_2)_3NH(CH_2)_4O]_2Ti[OCH(CH_3)_2]_2$
$[CH_3(CH_2)_3NH(CH_2)_4O]_4Ti$
$[CH_3(CH_2)_7NH(CH_2)_8O]_2Ti[OCH(CH_3)_2]_2$
$[CH_3(CH_2)_{12}NH(CH_2)_{13}O]_2Ti[OCH(CH_3)_2]_2$ (3(b))

$[HO(CH_2)_2NH(CH_2)_2O]_2Ti[OCH(CH_3)_2]_2$
$[HO(CH_2)_2NH(CH_2)_2O]_4Ti$
$[HO(CH_2)_4NH(CH_2)_4O]_2Ti[OCH(CH_3)_2]_2$
$[HO(CH_2)_4NH(CH_2)_4O]_4Ti$
$[HO(CH_2)_8NH(CH_2)_8O]_2Ti[OCH(CH_3)_2]_2$
$[HO(CH_2)_{13}NH(CH_2)_{13}O]_2Ti[OCH(CH_3)_2]_2$
$[(CH_3)_2N(CH_2)_2O]_2Ti[OCH(CH_3)_2]_2$ (4)

$[NH_2(CH_2)_2O]_2Ti[OCH(CH_3)_2]_2$
$[NH_2(CH_2)_2O]_4Ti$
$[NH_2(CH_2)_4O]_2Ti[OCH(CH_3)_2]_2$
$[NH_2(CH_2)_4O]_4Ti$
$[NH_2(CH_2)_8O]_2Ti[OCH(CH_3)_2]_2$
$[NH_2(CH_2)_8O]_4Ti$
$[NH_2(CH_2)_{16}O]_2Ti[OCH(CH_3)_2]_2$
$[NH_2(CH_2)_{26}O]_2Ti[OCH(CH_3)_2]_2$ (5)

$$(CH_3)_2CHO-\left[\begin{array}{c} O_2CCH_3 \\ | \\ Ti-O \\ | \\ OCH(CH_3)_2 \end{array}\right]_{20}-CH(CH_3)_2$$

$$(CH_3)_2CHO-\left[\begin{array}{c} O_2C(CH_2)_3CH_3 \\ | \\ Ti-O \\ | \\ OCH(CH_3)_2 \end{array}\right]_{10}-CH(CH_3)_2$$

$$HO-\left[\begin{array}{c} O_2C(CH_2)_7CH_3 \\ | \\ Ti-O \\ | \\ OH \end{array}\right]_{10}H$$

$$(CH_3)_2CHO-\left[\begin{array}{c} O_2C(CH_2)_{16}CH_3 \\ | \\ Ti-O \\ | \\ OCH(CH_3)_2 \end{array}\right]_{10}-CH(CH_3)_2$$

$$(CH_3)_2CHO-\left[\begin{array}{c} O_2C(CH_2)_{26}CH_3 \\ | \\ Ti-O \\ | \\ OCH(CH_3)_2 \end{array}\right]_{10}-CH(CH_3)_2$$

$$(CH_3)_2CHO-\left[\begin{array}{c} O_2C(CH_2)_7CH=CH(CH_2)_7CH_3 \\ | \\ Ti-O \\ | \\ OCH(CH_3)_2 \end{array}\right]_{10}-CH(CH_3)_2$$

$[H\overset{O}{\overset{\|}{C}}O]_2Ti[OCH(CH_3)_2]_2$ (6)

[HOCH$_2$CH$_2$O]$_2$Ti[OCH$_2$CH(CH$_3$)$_2$]$_2$
[HOCH$_2$CH$_2$O]$_4$Ti
[HO(CH$_2$)$_4$O]$_2$Ti[OCH$_2$CH(CH$_3$)$_2$]$_2$
[HO(CH$_2$)$_8$O]$_2$Ti[OCH$_2$CH(CH$_3$)$_2$]$_2$
[HO(CH$_2$)$_8$O]$_4$Ti
[HO(CH$_2$)$_8$O]$_2$Ti[OH]$_2$
[HO(CH$_2$)$_{18}$O]$_2$Ti[OCH(CH$_3$)$_2$]$_2$
[HO(CH$_2$)$_{18}$O]$_4$Ti
[HO(CH$_2$)$_{26}$O]$_2$Ti[OCH(CH$_3$)$_2$]$_2$
[CH$_3$(CH$_2$)$_3$CH(OH)CH$_2$O]$_2$Ti[OCH(CH$_3$)$_2$]$_2$
[HOC(CH$_3$)$_2$CH$_2$O]$_2$Ti[OCH(CH$_3$)$_2$]$_2$
[CH$_3$CHOHCHOHCH$_2$O]$_2$Ti[OCH(CH$_3$)$_2$]$_2$ (7)

[CH$_3$OCH$_2$CH$_2$O]$_2$Ti[OCH(CH$_3$)$_2$]$_2$
[CH$_3$OCH$_2$CH$_2$O]$_4$Ti
[CH$_3$(CH$_2$)$_2$O(CH$_2$)$_4$O]$_2$Ti[OCH(CH$_3$)$_2$]$_2$
[CH$_3$(CH$_2$)$_2$O(CH$_2$)$_4$O]$_4$Ti
[CH$_3$(CH$_2$)$_5$O(CH$_2$)$_6$O]$_2$Ti[OCH(CH$_3$)$_2$]$_2$
[CH$_3$(CH$_2$)$_5$O(CH$_2$)$_6$O]$_4$Ti
[CH$_3$(CH$_2$)$_9$O(CH$_2$)$_8$O]$_2$Ti[OCH(CH$_3$)$_2$]$_2$
[CH$_3$(CH$_2$)$_{14}$O(CH$_2$)$_{13}$O]$_2$Ti[OCH(CH$_3$)$_2$]$_2$
[CH$_3$CH$_2$(OCH$_2$CH$_2$)$_{15}$O]$_2$Ti[OCH(CH$_3$)$_2$]$_2$ (8)

[HO(CH$_2$CH$_2$O)$_2$]$_2$Ti[OCH(CH$_3$)$_2$]$_2$
[HO(CH$_2$CH$_2$O)$_2$]$_4$Ti
[HOCH$_2$CH$_2$O(CH$_2$)$_4$O]$_2$Ti[OCH(CH$_3$)$_2$]$_2$
[HO(CH$_2$)$_5$O(CH$_2$)$_5$O]$_2$Ti[OCH(CH$_3$)$_2$]$_2$
[HO(CH$_2$)$_{10}$O(CH$_2$)$_8$O]$_2$Ti[OCH(CH$_3$)$_2$]$_2$
[HO(CH$_2$)$_{10}$O(CH$_2$)$_8$O]$_4$Ti
[HO(CH$_2$)$_{12}$O(CH$_2$)$_{14}$O]$_2$Ti[OCH(CH$_3$)$_2$]$_2$
[HOCH$_2$CH$_2$(OCH$_2$CH$_2$)$_5$O]$_2$Ti[OCH(CH$_3$)$_2$]$_2$ (9)

[CH$_3$COCH=C(CH$_3$)O]$_2$Ti[OC$_3$H$_7$]$_2$
[CH$_3$COCH=C(CH$_3$)O]$_4$Ti
[CH$_3$CO(CH$_2$)$_{10}$CH=C(CH$_3$)O]$_2$Ti[OC$_3$H$_7$]$_2$
[CH$_3$CO(CH$_2$)$_{10}$CH=C(CH$_3$)O]$_4$Ti
[CH$_3$CO(CH$_2$)$_{13}$CH=C(CH$_3$)O]$_2$Ti[OC$_3$H$_7$]$_2$
[CH$_3$CO(CH$_2$)$_{19}$CH=C(CH$_3$)O]$_2$Ti[OC$_3$H$_7$]$_2$ (10)

[HOOCCH(CH$_3$)O]$_2$Ti(OH)$_2$
[HOOCCH(CH$_3$)O]$_4$Ti
[HOOC(CH$_2$)$_4$CH(CH$_3$)O]$_2$Ti(OH)$_2$
[HOOC(CH$_2$)$_4$CH(CH$_3$)O]$_4$Ti
[HOOCCH(C$_4$H$_9$)O]$_2$Ti[OCH(CH$_3$)$_2$]$_2$
[HOOCCH$_2$CH(C$_5$H$_{11}$)O]$_2$Ti[OCH(CH$_3$)$_2$]$_2$ (11(a))

(CH$_3$COOCH$_2$O)$_2$Ti[OCH(CH$_3$)$_2$]$_2$
(CH$_3$COOCH$_2$O)$_4$Ti
[CH$_3$(CH$_2$)$_3$COO(CH$_2$)$_2$O]$_2$Ti[OCH(CH$_3$)$_2$]$_2$
[CH$_3$(CH$_2$)$_3$COO(CH$_2$)$_2$O]$_4$Ti
[CH$_3$(CH$_2$)$_5$COO(CH$_2$)$_5$O]$_2$Ti[OCH(CH$_3$)$_2$]$_2$
[CH$_3$(CH$_2$)$_5$COO(CH$_2$)$_5$O]$_4$Ti
[CH$_3$(CH$_2$)$_9$COO(CH$_2$)$_7$O]$_2$Ti[OCH(CH$_3$)$_2$]$_2$
[CH$_3$(CH$_2$)$_{13}$COO(CH$_2$)$_{12}$O]Ti[OCH(CH$_3$)$_2$]$_2$ (11(b))

(CH$_3$OOCCH$_2$O)$_2$Ti[OCH(CH$_3$)$_2$]$_2$
(CH$_3$OOCCH$_2$O)$_4$Ti
[CH$_3$(CH$_2$)$_3$OOC(CH$_2$)$_2$O]$_2$Ti[OCH(CH$_3$)$_2$]$_2$
[CH$_3$(CH$_2$)$_5$OOC(CH$_2$)$_5$O]$_2$Ti[OCH(CH$_3$)$_2$]$_2$
[CH$_3$(CH$_2$)$_5$OOC(CH$_2$)$_5$O]$_4$Ti
[CH$_3$(CH$_2$)$_8$OOC(CH$_2$)$_8$O]$_2$Ti[OCH(CH$_3$)$_2$]$_2$
[CH$_3$(CH$_2$)$_{13}$OOC(CH$_2$)$_{12}$O]$_2$Ti[OCH(CH$_3$)$_2$]$_2$ (12)

(OCHCH$_2$O)$_2$Ti[OCH(CH$_3$)$_2$]$_2$
(OCHCH$_2$O)$_4$Ti
[OCH(CH$_2$)$_7$O]$_2$Ti[OCH(CH$_3$)$_2$]$_2$
[OCH(CH$_2$)$_7$O]$_4$Ti
[OCH(CH$_2$)$_{17}$O]$_2$Ti[OCH(CH$_3$)$_2$]$_2$
[OCH(CH$_2$)$_{25}$O]$_2$Ti[OCH(CH$_3$)$_2$]$_2$

Example 9

Equivalent results are obtained when the method of Example 4 is repeated using one of the following silanes in place of the methyltrimethoxysilane at the same mole percentage: vinyltrimethoxysilane, propyltrimethoxysilane, methyltriethoxysilane, allyltrimethoxysilane and phenyltriisopropoxysilane.

Example 10

Equivalent results are obtained when the method of Example 7 is repeated using one of the following curing catalysts in place of triethanol amine: beta-hydroxyethyltrimethylammonium 2-ethylhexoate, potassium hydroxide, trimethylammonium butoxide, lead octoate, and cobalt naphthenate.

Example 11

When 100 g. aluminum oxide is dipped into the silane-titanate mixture of Example 2, then dipped into water to form a slurry and the slurry shaped into a disc which is air dried to give a 25 percent by weight pick-up of resin in the alumina and the resulting article molded under pressure for 4 hours at 150° C. a strong well consolidated article results.

Example 12

When strips of alpha-cellulose paper are dipped (2 to 10 times with air drying between dippings) into 500 g. of a mixture of 87 mol percent dimethyldimethoxy and 13 mol percent of phenyltrimethoxy and 25 g. of tetrabutyltitanate then dipped into H$_2$O and then pre-cured at 100° C. and then stacked and molded at 14,000 p.s.i. at 140° C. for 30 minutes, a strong laminate with good dielectric strengths is obtained. The resulting laminate contained from 65 to 70 percent resin solids based on the weight of the filler.

That which is claimed is:

1. A method of preparing a silicone resin impregnated filler which comprises (1) contacting a filler with a mixture of (A) a silane of the formula R$_n$Si(OR')$_{4-n}$ in which R is selected from the group consisting of phenyl and monovalent aliphatic hydrocarbon radicals with less than four carbon atoms and R' is an alkyl group of less than 4 carbon atoms with $n$ having an average value of from .9 to 1.9 and (B) a hydrolysis catalyst selected from the group consisting of orthotitanates having the general formula Ti(OR")$_4$ and partial condensates thereof, in which R" is selected from the group consisting of hydrogen, hydrocarbon groups containing 1–30 carbon atoms and appropriately substituted hydrocarbons in which any atoms other than carbon and hydrogen are selected from the group consisting of nitrogen and oxygen atoms, said catalyst being present in an amount from .0002 to .06 mol of Ti per mol of Si, (2) then contacting the filler with water whereby the silane is at least partially hydrolyzed, and (3) then drying the impregnated filler to remove any water and alcohol whereby an organosiloxane is produced, said silane (A) being employed in such amount that there is a pick-up by the filler of at least 1.5 percent by weight residual organosiloxane based on the weight of the filler.

2. The method of claim 1 which contains the additional step of heating the dried impregnated filler to consolidate it.

3. The method of claim 1 in which a curing catalyst for the organosiloxane is used and which contains the additional step of heating the dried impregnated filler under pressure to consolidate it.

4. The method of claim 1 in which a curing catalyst for the organosiloxane is used.

5. The method of claim 1 in which R' is CH$_3$ and some of the R groups are methyl and some are phenyl radicals and R" is an alkyl group of from 1 to 18 inclusive carbon atoms.

6. The method of claim 5 which contains the additional step of heating the dried impregnated filler to consolidate it.

7. The method of claim 5 in which a curing catalyst for the organosiloxane is used and which contains the additional step of heating the dried impregnated filler under pressure to consolidate it.

8. The method of claim 5 in which a curing catalyst for the organosiloxane is used.

9. A method for the manufacture of an organosiloxane molded article which comprises (1) contacting a filler with a mixture of (A) a silane of the formula $R_nSi(OR')_{4-n}$ in which R is selected from the group consisting of phenyl and monovalent aliphatic hydrocarbon radicals with less than four carbon atoms and R' is an alkyl group of less than 4 carbon atoms with $n$ having an average value of from .9 to 1.9 and (B) a hydrolysis catalyst selected from the group consisting of orthotitanates having the general formula $Ti(OR'')_4$ and partial condensates thereof, in which R'' is selected from the group consisting of hydrogen, hydrocarbon groups containing 1–30 carbon atoms and appropriately substituted hydrocarbons in which any atoms other than carbon and hydrogen are selected from the group consisting of nitrogen and oxygen atoms, said catalyst being present in an amount from .0002 mol to .06 mol of Ti per mol of Si, (2) then contacting the filler with water whereby the silane is at least partially hydrolyzed, said silane (A) being employed in such amount that there is a pick-up by the filler of at least 1.5 percent by weight residual organosiloxane based on the weight of the filler, (3) pre-curing the impregnated filler to an extent such that the filler is sufficiently thermoplastic to be molded into a unitary mass, (4) subjecting the pre-cured filler to sufficient heat and pressure to bond and consolidate the filler, and (5) after-curing the resulting molded article at gradually increasing temperatures.

10. The method of claim 9 in which a curing catalyst for the organosiloxane is used.

11. The method of claim 9 in which R' is $CH_3$ and some of the R groups are methyl and some are phenyl radicals and R'' is an alkyl group of from 1 to 18 inclusive carbon atoms.

12. The method of claim 11 in which a curing catalyst for the organosiloxane is used.

13. A method for the manufacture of an organosiloxane laminate which comprises (1) contacting a fibrous sheet material with a mixture of (A) a silane of the formula $R_nSi(OR')_{4-n}$ in which R is selected from the group consisting of phenyl and monovalent aliphatic hydrocarbon radicals with less than 4 carbon atoms and R' is an alkyl group of less than 4 carbon atoms with $n$ having an average value of from .9 to 1.9, and (B) a hydrolysis catalyst selected from the group consisting of orthotitanates having the general formula $Ti(OR'')_4$ and partial condensates thereof, in which R'' is selected from the group consisting of hydrogen, hydrocarbon groups containing 1–30 carbon atoms and appropriately substituted hydrocarbons in which any atoms other than carbon and hydrogen are selected from the group consisting of nitrogen and oxygen atoms, said catalyst being present in an amount from .0002 to .06 mol of Ti per mol of Si, and (2) then contacting the material with water whereby the silane is at least partially hydrolyzed, said silane (A) being employed in such amount that there is a pick-up by the material of at least 1.5 percent by weight residual organosiloxane based on the weight of the material, (3) pre-curing the impregnated sheet of material to an extent such that it is sufficiently thermoplastic to be laminated with other sheets of impregnated material, (4) assembling multiple plies of the sheets of material so impregnated and pre-cured to form a laminate, (5) subjecting the assembly to sufficient heat and pressure to bond and consolidate the plies, and (6) after-curing the resulting laminate at gradually increasing temperatures.

14. The method of claim 13 in which a curing catalyst for the organosiloxane is used.

15. A method for the manufacture of an organosiloxane laminate which comprises the steps of (1) dipping a fibrous sheet material into a mixture of (A) a silane of the formula $R_nSi(OCH_3)_{4-n}$ in which some of the R groups are methyl and some are phenyl radicals with $n$ having an average value of from .9 to 1.9, (B) a hydrolysis catalyst selected from the group consisting of orthotitanates having the general formula $Ti(OR'')_4$ and partial condensates thereof, in which R'' is an alkyl group of from 1 to 18 inclusive carbon atoms, said catalyst being present in an amount from .0002 to .06 mol of Ti per mol of Si, (2) then dipping the fibrous material into water whereby the silane is at least partially hydrolyzed, said silane (A) being employed in amount such that there is at least 1.5 percent by weight residual organosiloxane on said fibrous material, (3) pre-curing the impregnated sheet of material to an extent such that it is sufficiently thermoplastic to be laminated with other sheets of impregnated material, (4) assembling multiple plies of the sheets of material so impregnated and pre-cured to form a laminate, (5) subjecting the assembly to sufficient heat and pressure to consolidate and bond the plies, and (6) after-curing the resulting laminate at gradually increasing temperatures.

16. The method of claim 15 in which a curing catalyst for the organosiloxane is used.

References Cited by the Examiner
UNITED STATES PATENTS

| | | | |
|---|---|---|---|
| 2,486,162 | 10/1949 | Hyde | 260—46.2 |
| 2,718,483 | 9/1955 | Clark. | |
| 2,970,126 | 1/1961 | Brown. | |
| 2,993,809 | 7/1961 | Bueche et al. | |
| 3,151,099 | 9/1964 | Ceyzeriat et al. | 260—448.2 XR |

EARL M. BERGERT, *Primary Examiner.*

L. J. BERCOVITZ, *Examiner.*

J. P. MELOCHE, L. G. KASTRINER,
*Assistant Examiners.*